United States Patent
Wilson (10) Patent No.: US 6,451,239 B1
(45) Date of Patent: Sep. 17, 2002

(54) PROCESS OF MAKING A HOOK FASTENER USING RADIO FREQUENCY HEATING

(76) Inventor: Robert B. Wilson, 1 Edgewater La., South Hadley, MA (US) 01075

( * ) Notice: Subject to any disclaimer, the term of this patent is extended or adjusted under 35 U.S.C. 154(b) by 34 days.

(21) Appl. No.: 09/638,220

(22) Filed: Aug. 14, 2000

Related U.S. Application Data (60) Provisional application No. 60/150,326, filed on Aug. 23, 1999.

(51) Int. Cl.[7] .............................................. B29C 35/08
(52) U.S. Cl. ....................................... 264/491; 264/322
(58) Field of Search ............................... 264/491, 475, 264/220, 225, 167, 322

(56) References Cited

U.S. PATENT DOCUMENTS

| | | | |
|---|---|---|---|
| 3,444,275 A | * | 5/1969 | Willett ........................ 219/772 |
| 4,662,037 A | | 5/1987 | Provst et al. |
| 4,840,758 A | | 6/1989 | Thorsrud |
| 4,851,167 A | | 7/1989 | Marc |
| 4,872,243 A | * | 10/1989 | Fischer ......................... 24/442 |
| 5,800,760 A | * | 9/1998 | Takizawa et al. ........... 264/167 |
| 5,811,186 A | | 9/1998 | Martin et al. |
| 5,861,211 A | | 1/1999 | Thakkar et al. |
| 5,972,463 A | | 10/1999 | Martin et al. |
| 6,187,247 B1 | * | 2/2001 | Buzzell et al. ............ 264/328.1 |
| 6,224,364 B1 | * | 5/2001 | Harvey ..................... 264/328.7 |

FOREIGN PATENT DOCUMENTS

JP    J6 0108003    6/1985

* cited by examiner

*Primary Examiner*—Mark Eashoo
(74) *Attorney, Agent, or Firm*—Robert A. Seemann (57) ABSTRACT

A method for forming hooks for a hook and loop fastener on an item extending from a portion of the item, forming the hooks with the item from material of the item that is melted into tubelets bent to an included angle of less than 90 degrees, by heat generated by the material in response to radio frequency energy passed into the material.

17 Claims, 5 Drawing Sheets

PROCESS OF MAKING A HOOK FASTENER USING RADIO FREQUENCY HEATING

This application claims the benefit of U.S. Provisional Application No. 60/150,326, filed Aug. 23, 1999.

BACKGROUND OF THE INVENTION

1. Field of the Invention

The invention pertains to forming an element of construction in one piece with the hooks of a hook and loop fastener.

2. Description of the Prior Art

In the prior art, the hook portion of a hook and loop fastener, on a strip by, for example, the portion of a Velcro tm hook and loop fastener strip that has the plurality of attachment hooks, is combined with an element of construction of an item, for example a panel, by gluing or sewing the strip to the panel. This is labor intensive. Precise mounting of the Velcro tm strip on a panel of each item, item after item, is difficult.

SUMMARY OF THE INVENTION

A plurality of hooks for hook and loop fastening are molded in one piece with an item from a first material, the first material being sensitive to radio frequency energy so that said first material heats when exposed to radio frequency energy. The plurality of hooks are molded from the first material in hook shaped tubelets exposed to sufficient radio frequency energy to melt the first material, in a second material that is continuous around the circumference of each tubelet and less sensitive to radio frequency energy than the first material.

A mold for making a plurality of hooks for hook and loop fastening includes a base comprising a first material, a first surface on the base for receiving a second material to be molded into the hooks, a plurality of tubelets, each tubelet comprising a first open end, the tubelet turning back forming an included angle of less than 90 degrees and the first end being open to the first surface for receiving the second material in the tubelet, the first surface comprising a shape for molding an element simultaneously with the hooks from the second material.

A mold for making a plurality of hooks for hook and loop fastening includes a base comprising a first material, a first surface on the base for receiving a second material to be molded into the hooks, a plurality of tubelets, each tubelet comprising a first open end, the tubelet turning back forming an included angle of less than 90 degrees and the first end being open to the first surface for receiving the second material in the tubelet, the first material is continuous around the circumference of each tubelet. Further, the second material is in each tubelet and extends in a continuous layer over the first surface into the first opening of each tubelet and is sensitive to radio frequency energy so that the second material heats when exposed to radio frequency energy. Preferably the first material is less sensitive to radio frequency energy than the second material, and contains silicone.

A method for making hooks for hook and loop fastening comprises: putting a first material into a plurality of tubelets in a second material, each tubelet is open at a first end and turns back forming an included angle of less than 90 degrees, waiting until the material in each tubelet cools into a resilient element within the tubelet, and drawing the resilient element from the tubelet so that the element can resile into a hook. Preferably the first material is put far enough into the tubelet so that the trailing end of the resilient element in the tubelet moves toward the apex of the included angle and then away from the apex of the included angle as the resilient element is drawn from the tubelet by way of the first end. Preferably heating the first material with heat generated by the first material by delivering radio frequency energy to the first material. Further, before putting the first material into the plurality of tubelets, casting the second material around each hook of a plurality of hooks designed for hook and loop fastening forming the plurality of tubelets in the second material, and drawing the hooks out of the tubelets.

A method for making hooks for hook and loop fastening comprises: putting a first material into a plurality of tubelets in a second material, each tubelet is open at a first end and turns back forming an included angle of less than 90 degrees, waiting until the first material in each tubelet changes state to a resilient element within the tubelet, and drawing the resilient element from the tubelet so that the element can resile into a hook. Further, before putting the first material into the plurality of tubelets, casting the second material around each hook of a plurality of hooks designed for hook and loop fastening forming the plurality of tubelets in the second material, and drawing the hooks out of the tubelets.

A method for making an item with hooks for hook and loop fastening extending from the item comprises: putting material for molding the item onto a mold for molding at least a portion of the item, over and into a plurality of openings of first ends of tubelets, each tubelet turning back forming an included angle of less than 90 degrees, and into each tubelet at the first end far enough so that the material extends past the apex of the included angle, and drawing the material from the tubelets by removing the molded portion of the item from the mold. Preferably heating the material with heat generated by the material by delivering radio frequency energy to the material. Before putting the material for molding the item into the mold, casting mold material around the portion of the item combined with hooks designed for hook and loop fastening, and around each hook, forming the plurality of tubelets.

Plastic material that has a high degree of radio frequency sensitivity so that it is self-heating and softened by absorbing the radio frequency energy, is enclosed in a mold which forms the plastic material into an element of construction that includes hooks of a hook and loop fastening system on a face of the element.

The starting plastic material can be in any form including powder, pellets, or sheet, and includes rigid vinyl, nylon and an ionomer having the radio frequency sensitivity.

The mold is preferably formed of a silicone material that is not sensitive to radio frequency so that it is not significantly heated by the radio frequency energy. Usable silicone materials include silicone rubber and silicone plastic.

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

In this specification, the word "tubelet" and its plural "tubelets" represents the elements that were spelled "tube-lets" for the plural in U.S. provisional application No. 60/150,326 filed Aug. 23, 1999.

The invention is not limited to use with the following construction element which is provided by way of example.

Construction element 30 is used to connect a first item to a second item The first and second items are not shown.

Referring to FIGS. 1–6, knob 28 on construction element 30 is designed to snap into a close-fitting opening in a first item in order to attach end 34 of element 30 to the first item. Hooks 36 are designed to attach end 40 of element 30 to loops on a second item, so that construction element 30 connects the first item to the second item.

Figure 1:
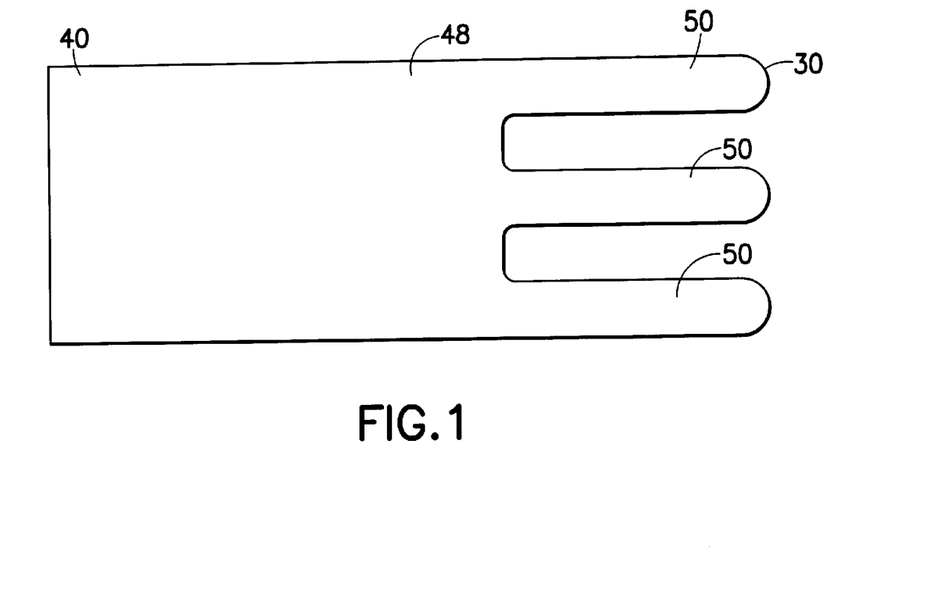
FIG. 1 is a top view of a construction element made by the invention.
Figures 2, 3:
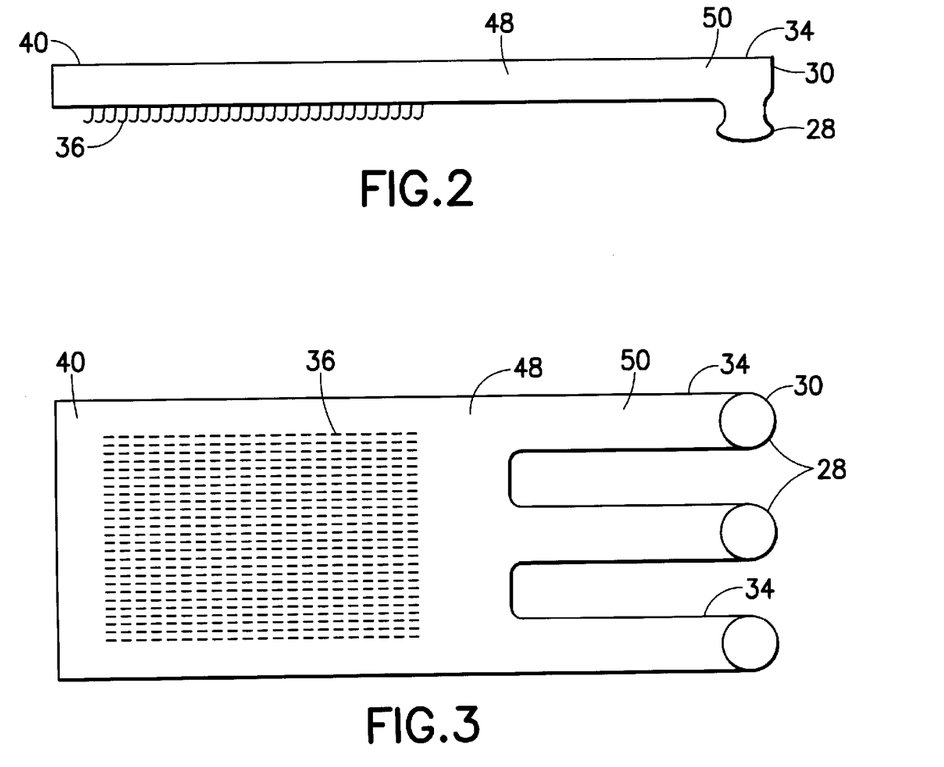
FIG. 2 is a front view of the construction element of FIG. 1.
FIG. 3 is a bottom view of the construction element of FIG. 1.

Hooks 36 are molded in one piece with panel 48 and fingers 50.

Figure 4:
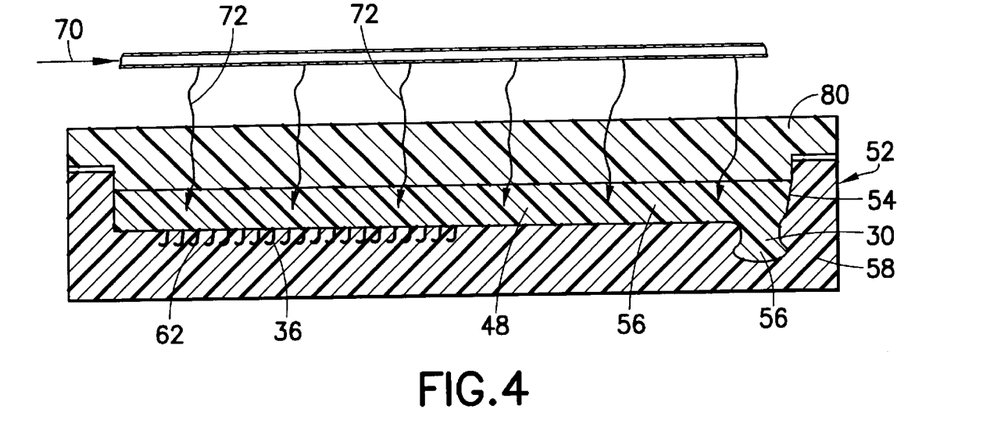
FIG. 4 is a cross section view of a mold of the invention, containing the construction element of FIGS. 1–3, being formed by the mold and radio frequency energy transmitted into the mold.
Figure 5:
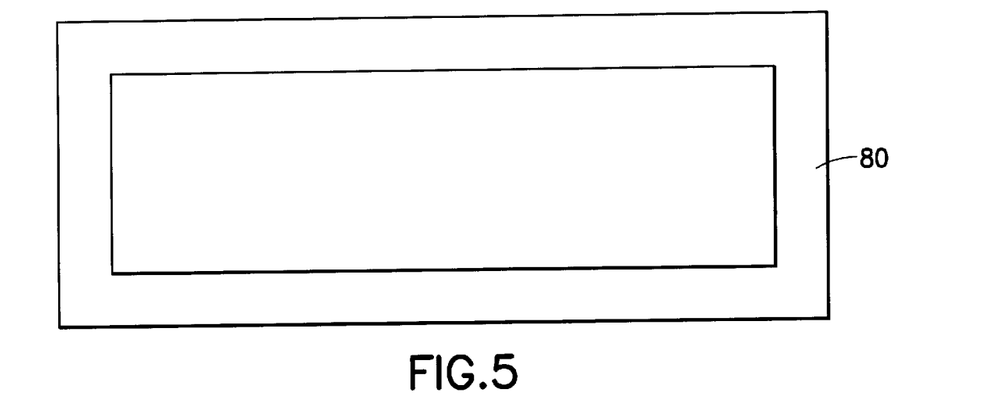
FIG. 5 is a bottom view of the top plate of the mold of FIG. 4.
Figure 6:
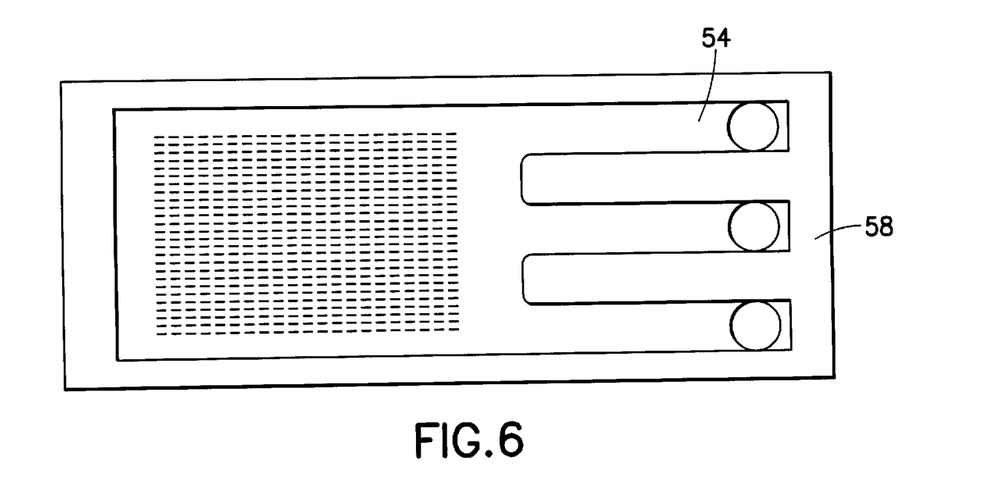
FIG. 6 is a top view of the bottom plate of the mold of FIG. 4.

In FIG. 4 element 30 is being formed in one piece with knobs and hooks in mold 52. Sufficient amount of radio frequency sensitive plastic 56 in sheet or powder is put in cavity 54 which contains the mold shape of panel 48, fingers 50, knobs 28, and hooks 36, to form element 30.

Cavity 54 including hollow tubelets 62 for forming the hooks is formed in silicone base 58 by setting a model, or a master sample, of element 30 in silicone, curing the silicone, and removing the model or master sample.

The radio frequency sensitive plastic is sensitive to radio frequency energy 70 of a predetermined radio frequency that is delivered 72 into the mold so that the plastic heats when it receives the radio frequency energy. The predetermined radio frequency can be a single frequency or a group of frequencies.

Silicone base 58 is preferably not sensitive to radio frequency energy at the predetermined frequency, so it is not significantly self-heated by the radio frequency energy sent through it or into it. Silicone base materials that behave in this manner include silicone rubber.

Top plate 80 of mold 52 is preferably not sensitive to radio frequency energy at the predetermined frequency, so it is not self-heated by radio frequency energy sent through it or into it.

When the plastic cools, element 30 is pulled out of cavity 54, drawing hooks 36 formed therein from hooked tubelets 62 in silicone base 58.

Figure 7:
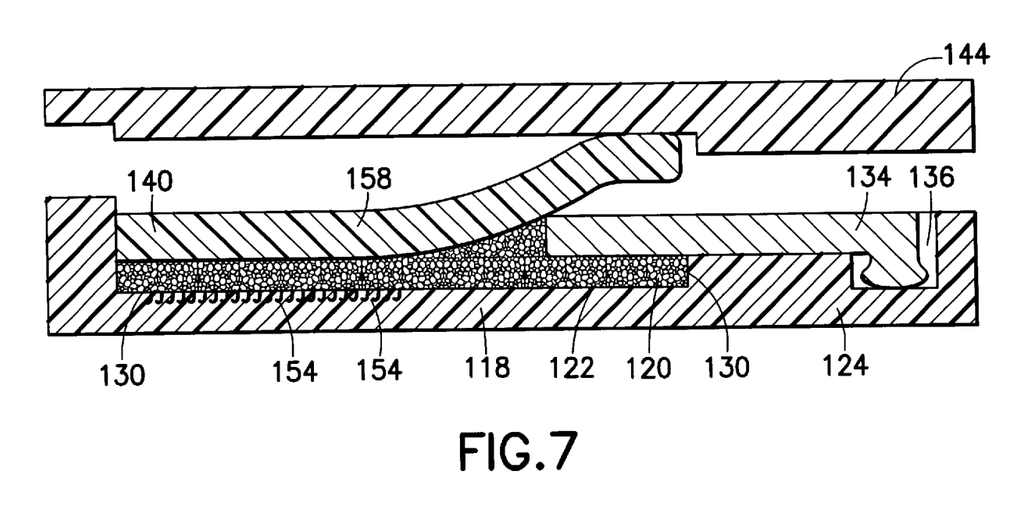
FIG. 7 is a cross section side view of another construction element being formed in a mold according to the invention.

In FIG. 7, granules 120 of radio frequency energy sensitive plastic 122 are loaded into cavity 130 in silicone rubber 118 of base 124. The granules self-heat from radio frequency energy delivered into the cavity.

Finger 134 of a plurality of fingers is laid on base 124 with the rest of the plurality of fingers. Cavity 136 of a plurality of cavities in base 124 that hold the fingers in predetermined alignment, receives finger 134. The fingers are made of a material that is not sensitive to the radio frequency energy at the radio frequency used when the energy is delivered into the cavity.

Strip 140 of radio frequency energy sensitive plastic 158 is placed over the granules and fingers. Strip 140 self heats from radio frequency energy delivered into the cavity. Plastic 122 and plastic 158 are different plastics, but could be the same type of plastic.

Mold plate 144 is pressed onto the materials in the cavities, and the radio frequency energy is delivered into the mold so that granules 120 and strip 140 self heat by the radio frequency energy and melt to each other, and to fingers 134. The melted plastic of granules 120 is forced into hollow hooked tubelets 154 which form plastic 122 into hooks 156. The plastic solidifies when it is cooled.

As the hooks of solidified plastic are drawn out of the silicone rubber tubelets, the hooks partially unbend which reduces resistance to their removal from the tubelets.

Solidified plastic 122 is resilient enough so that the hook partially unbends during removal from the tubelet and one out of the tubelet, the hook resiles, returning to hook shape. Solidified plastic 122 has sufficient tensile strength so that the hook is not torn apart as it is drawn from the tubelet.

The mold material is preferably elastic enough so that the tubelet walls yield slightly and resile as the hooks are withdrawn from the mold material. The mold material being much less sensitive to radio frequency energy than the plastic reduces waiting time for cooling of the tubelets for removal of the hooks.

Figure 8:
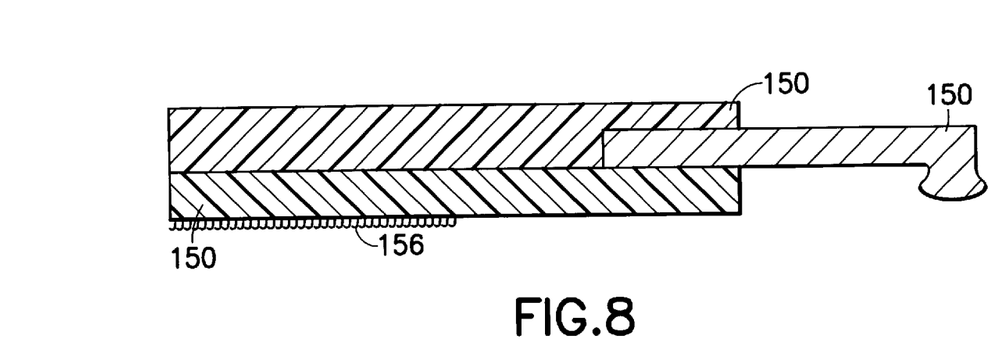
FIG. 8 is a cross section side view of the construction element of FIG. 7.
Figure 9:
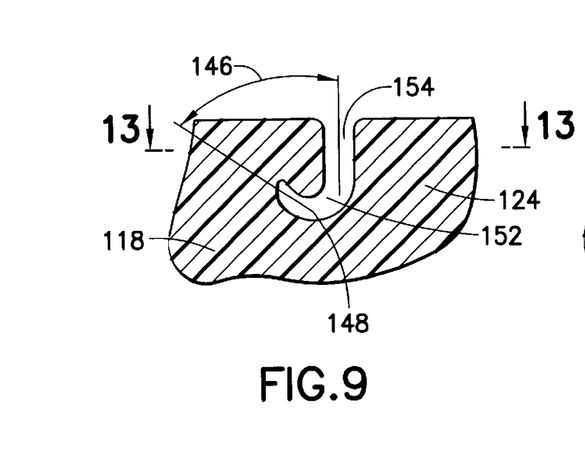
FIG. 9 is a cross section enlarged side view of a tubelet of the mold of FIG. 7.

When the melted plastic cools, element 150 is formed. Element 150 is stripped out of the mold cavity, drawing integrally formed hooks 156 with it.

Referring to FIGS. 9–13, FIG. 9, shows an empty hollow tubelet 154 in base 124.

Figure 10:
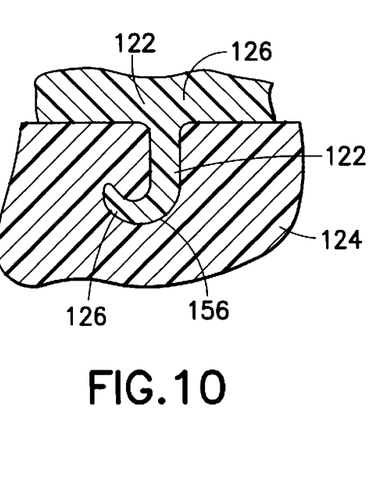
FIG. 10 is a cross section enlarged side view of a hook of the construction element of FIG. 7 formed in the tubelet of FIG. 9.

In FIG. 10, plastic 122 granules 120 in the melted state 126, fill tubelet 154 and set in the shape of a hook by taking the hook shape of opening 152 of tubelet 154.

Figure 13:
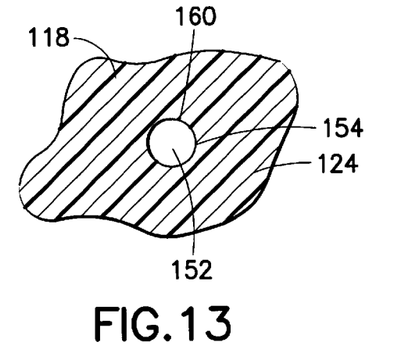
FIG. 13 is a cross section view of FIG. 9 taken along 13—13.

Referring to FIG. 13, mold material 118 is continuous around circumference 160 of tubelet 154.

Figure 11:
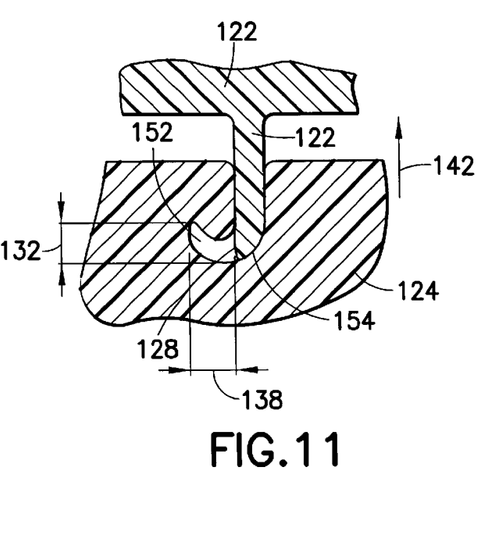
FIG. 11 is a cross section enlarged side view of the hook of FIG. 10 being drawn out of the tubelet.
Figure 12:
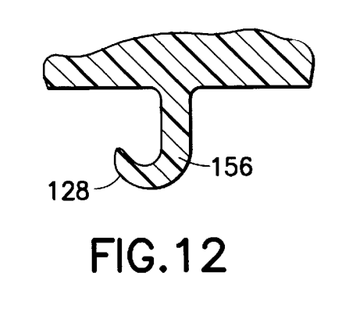
FIG. 12 is a cross section enlarged side view of the hook of FIG. 10 after it is drawn out of the tubelet.

In FIG. 11 set plastic 122 is drawn out of cavity 154. Free or trailing end 128 of the hook is drawn a distance inward 132 compared to the outward direction 142 of tubelet 154, and a distance laterally 138 compared to the outward direction 142 of tubelet 154. Free end 128 moves toward and away from apex 148 of the hook shape of tubelet 154. Hook 156 is bent to almost straight as it is drawn out of opening 152. It then resiles back into hook shape after it is removed from opening 152. FIG. 12 shows the completed hook Tubelet 154 preferably turns at apex 148 at least 90 degrees from the line of outward direction 142, preferably turning backward on itself forming an included angle 146 of less than 90 degrees.

Hooks for a hook and loop fastener can be molded in a mold comprising the hooked tubelets by injection molding. The hooks can be made from a material that is not sensitive to radio frequency energy.

Figure 14:
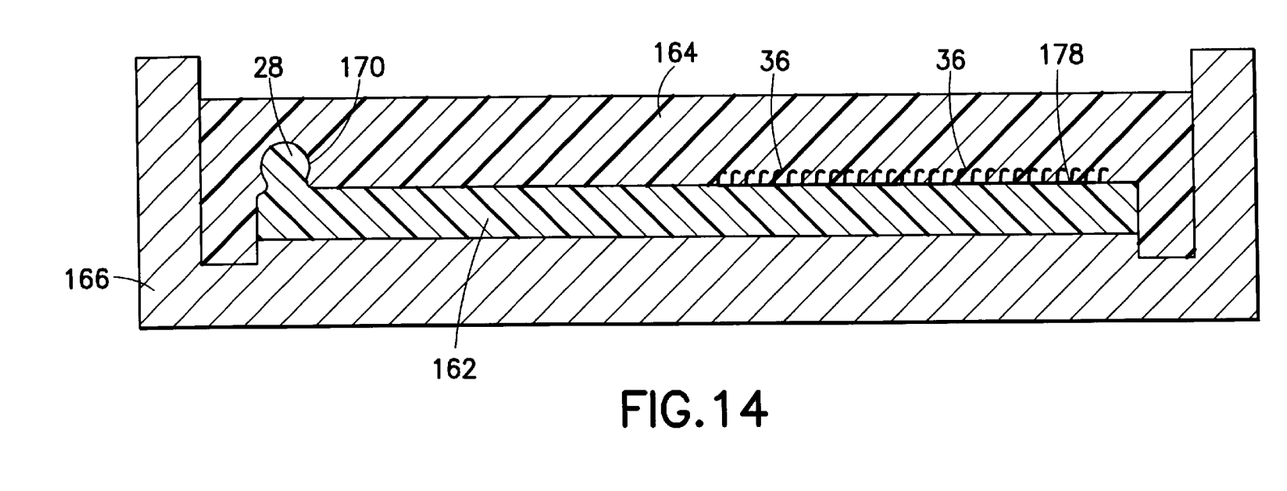
FIG. 14 is a cross section view of a model of the element of FIG. 2 forming a mold.

In FIG. 14, base 58 of mold 52 for construction element 30 is made by placing model 162 of construction element 30 into frame 166 and pouring silicone rubber 164 into the frame onto the model so that the rubber encloses individual hooks of hook and loop fastener hooks 36 and upward and side surfaces of the model including panel 48, fingers 34 and knobs 28. After silicone rubber 164 cures, it is removed from model 162 and frame 166 so that it is base 58. As the cured silicone rubber is removed, the model's hooks 36 in the silicone rubber unbend as they are drawn out of the silicone rubber, each hook leaving hollow curved tubelets in the silicone rubber which are complementary to the shapes of hooks 36. Knobs 28 leave hollow complementary shapes 170 of knobs 28 in the resilient rubber mold, and the fingers and panel 48 leave their complementary cavities.

Model 162 is made by forming the panel, fingers and knobs from one or more pieces and attaching strip 178 that contains hook and loop fastener hooks to the panel by adhesive or other fastening means so that the fastening means is not damaged by or harmfully resists removal of the cured silicone rubber.

The hooks of an existing hook and loop, or nap, fastener system can be copied by making a mold from a part containing the hooks by casting the hooks in a silicone compound or mixture, then using the mold in the radio frequency molding described above. The part can be modified or changed before molding to produce a new different part containing the hooks.

Figure 15:
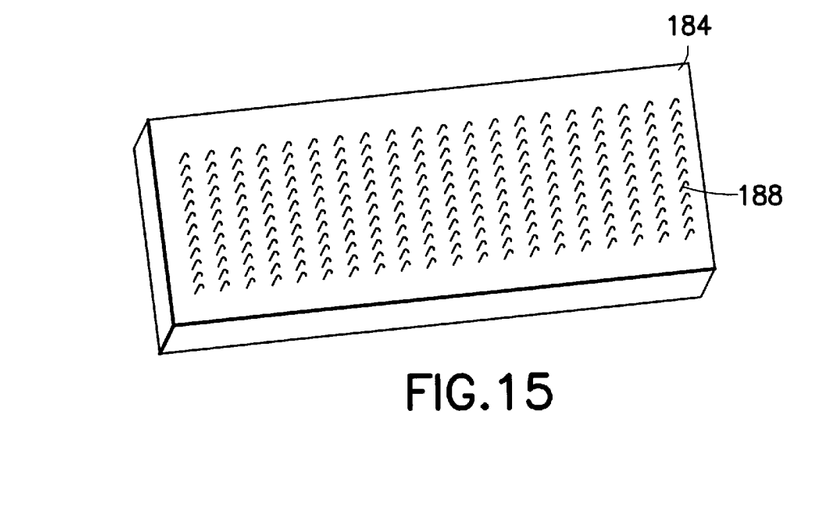
FIG. 15 is a perspective view of a thin panel constructed with hooks of a hook and loop fastener according to the invention.

FIG. 15 shows panel 184 cast with hooks 188 of a hook and loop fastener in a single unit. A model comprising a hook strip from a hook and loop fastener system glued on a plate, is inserted hook side upward in a frame like frame 166. Silicone rubber that is not sensitive to radio frequency energy at a first radio frequency is added to the frame so that it surrounds the sides of the plate and surrounds each hook like FIG. 13 forming a cavity and hooked tubelets that are filled with the plate and hooks.

After the silicone rubber cures, it is separated from the plate and hooks, so that the rubber becomes a mold.

Plastic sheet or powdered plastic that is sensitive to radio frequency energy at a first radio frequency is added to the mold in sufficient amount to form the hooks and desired thickness of panel 184. The radio frequency energy at the first radio frequency is passed into the plastic which melts within the plate cavity and into the tubelets. After the plastic sets, it is removed, drawing the hooks from the tubelets with the newly formed plate.

Tests were conducted to make and evaluate elements with hook and loop fastener hooks. A flow mold machine using a radio frequency generator manufactured by Compo Company, available from used machinery sources, was used.

The radio frequency generator, model E, includes an energy output range of 20 kw to 100 kW at a frequency of 27.12 megahertz. The generator transfers rf energy to an air operated press which operates at 40 psi to 120 psi. A 6 foot diameter turntable with 4 to 8 stations delivers molds to a position under the air press. A metal plate that is plumbed to allow cooling fluids to circulate through it is mounted on the press.

A mold was indexed under the press. The press was lowered onto the mold which contained radio frequency energy sensitive plastic and was covered by a silicone foamed rubber blanket that was 0.250 inches thick. While the mold was under pressure, radio frequency energy was applied from the generator. The rf caused the plastic to heat up to a semi-liquid state. While the plastic was in a semi-liquid state, it flowed into the mold cavities. The flow was assisted by the rubber blanket and 120 psi air pressure in a 8 inch diameter pneumatic cylinder exerting downward pressure.

The heating cycle was controlled by a timer that was set to match the time required to achieve the proper melt. After the sealing was complete a second timer started a cooling cycle. The rf output, and power tuning was adjusted to allow more or less energy to adjust for the size of the mold.

During the cooling cycle, fluids were calculated through the press head to accelerate the cooling. After the cooling cycle the press released the mold.

The mold was constructed from a material that does not heat up from the radio frequency energy. Silicone rubber was used for the tests.

Other materials that do not heat up from the radio frequency energy, that can be used for making the mold include but are not limited to ceramics, nylons and certain metal configurations.

Plastics that are considered to be polar in nature, that heat when exposed to rf energy include polyvinyl chloride (PVC), polyurethane, ethylvinylacetate (EVA) and nylon 6/6.

A part having hook and loop fastener hooks was used as a master to be copied. The parts was 3 inches by 0.750 inches by 0.125 inches and was cast in a 3 up mold configuration.

Three of the hook parts were mounted, by adhesive, onto a flat metal plate. A frame was constructed to fit around the mounted parts. The frame determined the overall size and thickness of the mold. The mold was 0.500 inches larger in the length and width than the mounted part. The thickness was 0.375 inches. These dimensions are preferred dimensions as they generally sufficed.

The curable silicone, was Plastisol brand silicone rubber, a two part (A and B) system that is available from Castall, Inc., Weymouth Industrial Park, East Weymouth, Mass. The silicone rubber was mixed in sufficient quantity to fill the mold frame. The mix was placed in a vacuum chamber that removed air from the mix, in order to prevent bubbles from forming in the cured mold. The mix was then poured over the framed part. A heavy metal plate was immediately placed on top of the frame to force any excess silicone out over the frame walls, creating a uniform mold thickness.

After the mold cured for 24 hours, although 12 hours could have been acceptable, it was separated from the original parts and after another 12 hours was considered safe to use for production.

The plastics used for molding the test parts were PVC.

PVC can be found in either liquid or solid form, the liquid form, Plastisols, can be formulated with a large range of properties and are easier than solid pellets or multiple layers of films to load into a mold cavity. The liquid Plastisol can be manually poured or injected by equipment that meters the material injection automatically. If a liquid is used, it is usually pre cured with a heat source prior to molding to accelerate the process. During the molding process a second non rf receptive material can be combined with the semi liquid plastic as a carrier for the plastic.

A polyester knitted material was found for a carrier in the test. The melted plastic flowed into the knitted material and formed a permanent bond with the carrier when the plastic cooled. Using the invention, an element with or without the knitted material can be molded in one piece simultaneously with hooks of a hook and loop fastener extending from the element.

Test #1:
 Plastic material: Plastisol opaque black, durometer shore A 60-0.00402 oz.
 Carrier material: Open polyester knitted mesh
 Equipment:30 kW Compo flowmolder with 8' 6 station 8 foot diameter turntable
  RF energy:22% of generator tuning scale
  Sealing time:10 seconds
  Cooling time:20 seconds
  Gel time:10 seconds
 Results: Good reproduction of the hooks. The hooks were very flexible. At A 60 the hooks did not have a strong grip on hook and loop fastener loops.
The plastic bond to the mesh was excellent.
Test #2:
 Plastic Material: Plastisol opaque black, durometer A80-0.00402 oz.
 Carrier material: Open polyester knitted mesh
 Equipment:30 kW Colmpo flowmolder with 8 ft 6 station turntable
  Rf energy:29%
  Sealing time:12 seconds
  Cooling time:25 seconds
  Gel time:15 seconds
 Results: Good reproduction of hooks. The hooks were very flexible. They unbent sufficiently to pull out of the silicone rubber mold hooked tubelets without damage to the hooks thus formed. At A 80 the grip on the loops was better than in test #1. Plastic bonding to the mesh was excellent.
Test #3:
 Plastic material: Plastisol opaque black, durometer A90-0.00402 oz.
 Carrier material: Open polyester knitted mesh
 Equipment:30 kW Colmpo flowmolder with 8 ft 6 station turntable
  RF energy:30%
  Sealing time:12 seconds
  Cooling time:30 seconds
  Gel time:15 seconds
 Results: Good reproduction of hooks. Although the hooks unbent sufficiently to pull out of the silicone rubber mold hooked tubelets without breaking, and the hooks had good grip on the loops, about 30 percent of the hooks had their ends break off when the molded item's hooks were subjected to 30 cycles of engaging and releasing from loop material. Plastic bonding to the mesh was excellent.
Test #4:
 Plastic material: Plastisol opaque black, durometer A 50 with 20% A 90 powdered PVC with impact modifier.
 Carrier material: Open polyester knitted mesh
 Equipment:30 kW Compo flowmolder with 8 ft 6 station turntable
  RF energy:24.70%
  Sealing time:11 seconds\
  Cooling time:25 seconds
  Gel time:15 seconds
 Results: Good reproduction of the hooks. The Plastisol and powdered PVC blended well and the combination including the impact modifier created stiff and strong hooks that unfolded sufficiently to pull from the silicone rubber mold hooked tubelets without breaking, attached strongly to the loops and were not damaged when pulled away from the loops. Plastic bonding to the mesh was excellent.

Although silicone material is preferred for the mold, other materials that will not adhere to the set plastic, which can cast the hooked tubelets from hooks, that slidingly release hooks of the set plastic from the hook-shaped tubelets with low friction can be used. Preferably the material for the mold has low sensitivity to radio frequency energy a the molding radio frequency. Preferably material for the mold is resilient so that it yields to the removal of the hooks and resiles.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

I claim:

1. A method for making hooks for hook and loop fastening comprising:
 putting a first radio frequency energy sensitive material into a first end of each tubelet of a plurality of tubelets in a second material, wherein each tubelet of the plurality of tubelets is open at the first end and turns back forming an included angle of less than 90 degrees,
 delivering radio frequency energy to the first material so that the first material heats from the radio frequency energy, while pressing the first material into the first end of each tubelet,
 waiting until the first material in each tubelet cools into a resilient element within the tubelet, and
 drawing the resilient element from each tubelet so that the element can resile into a hook.

2. The method of claim 1 further comprising:
 putting the first material far enough into the tubelet so that a trailing end of the resilient element in the tubelet moves toward the apex of the included angle and then away from the apex of the included angle as the resilient element is drawn from the tubelet by way of the first end.

3. The method of claim 2 further comprising:
 drawing the resilient element from the tubelet by way of the first end.

4. A method for making hooks for hook and loop fastening comprising:
 putting a first radio frequency sensitive material into a mold cavity comprising a plurality of tubelets integrally formed in a base containing silicone, each tubelet being continuously walled and resilient, is open at a first end and turns back forming an included angle of less than 90 degrees,
 delivering radio frequency energy to the first material in the mold cavity so that the first material heats in the mold cavity from the radio frequency energy, pressing the first material into the first end of each tubelet, waiting until the first material in each tubelet changes state to a resilient element within the resilient tubelet, and drawing the resilient element from the tubelet so that the element can resile into a hook.

5. The method of claim 4 further comprising:

delivering the radio frequency energy to the first material in the mold cavity so that the first material heats from the radio frequency energy while pressing the first material into the first end of each tubelet.

6. A method for making an item with integrally formed hooks for hook and loop fastening comprising:

putting radio frequency sensitive material for molding the item into a mold comprising a surface containing silicone, complementary shaped for molding at least a portion of the item, the surface comprising a plurality of openings of first ends of tubelets, each tubelet turning back forming an included angle of less than 90 degrees, delivering radio frequency energy to the radio frequency sensitive material in the mold so that the material heats in the mold from the radio frequency energy, forcing the heated radio frequency sensitive material against the complementary surface and into each tubelet at said first end far enough so that the radio frequency sensitive material extends past the apex of the included angle, waiting until the plastic in the tubelets cools until it forms hooks that can be withdrawn from the tubelets without tearing the hooks, and drawing the radio frequency sensitive material from the tubelets by removing the molded portion of the item from the mold.

7. The method of claim 6 further comprising:

Before putting the material for molding the item into the mold, casting mold material around the portion of the item combined with hooks designed for hook and loop fastening, and around each hook, forming the plurality of tubelets.

8. A method for making an article comprising integrally formed hooks for hook and loop fastening, the method comprising:

putting radio frequency energy sensitive plastic into a mold cavity comprising a surface that is complementary shaped to form at least a portion of the article, the surface comprising a plurality of openings of first ends of hollow hooked tubelets, delivering radio frequency energy to the plastic in the mold cavity so that the plastic heats in the cavity from the radio frequency energy, putting pressure on the plastic so that the plastic is urged against the shaped surface, through the plurality of openings, and into the tubelets, waiting until the plastic in the tubelets cools until it forms hooks that can be withdrawn from the tubelets without tearing the hooks, and withdrawing the portion of the article with integrally formed hooks from the complementary surface and tubelets.

9. The method of claim 8 further comprising:

delivering the radio frequency energy to the plastic in the cavity while putting the pressure on the plastic in the cavity.

10. A method for making an article with integrally formed hooks for hook and loop fastening, the method comprising:

loading a first element of the article into a cavity of a mold for the article, loading radio frequency sensitive plastic into the cavity, delivering radio frequency energy to the plastic in the mold cavity so that the plastic heats from the radio frequency energy, applying compression to the plastic so that the plastic is forced against the first element and into a plurality of hook-shaped tubelets in the mold, each tubelet of the plurality of tubelets having a first end that is open to the cavity.

waiting until the melted plastic cools and strip the article with integrally formed hooks from the cavity and tubelets.

11. The method of claim 10 further comprising:

delivering the radio frequency energy to the plastic in the cavity while applying compression to the plastic.

12. A method for making an article with integrally formed hooks for hook and loop fastening, the method comprising:

loading a first element of the article into a cavity in an elastic material comprising silicone, of a mold for the article, loading radio frequency sensitive plastic into the cavity, delivering the radio frequency energy to the plastic in the mold cavity so that the plastic heats from the radio frequency energy, applying a compressive surface to the plastic so that the plastic is forced against the first element and into a plurality of hook-shaped tubelets in the mold, each tubelet of the plurality of tubelets having a first end that is open to the cavity, waiting until the melted plastic cools and strip the article with integrally formed hooks from the cavity and tubelets.

13. The method of claim 12 further comprising:

delivering the radio frequency energy to the plastic in the mold cavity while applying the compressive surface to the plastic.

14. The method of claim 13 wherein:

the elastic material comprising silicone is silicone rubber.

15. A method for making an article with integrally formed hooks for hook and loop fastening, the method comprising:

loading a first element of the article into a cavity in an elastic material comprising silicone, of a mold for the article, loading radio frequency sensitive plastic into the cavity, delivering the radio frequency energy to the plastic in the mold cavity so that the plastic heats in the cavity from the radio frequency energy, applying a compressive surface to the plastic so that the plastic is forced against the first element and into a plurality of hook-shaped tubelets in the mold, integrally formed in the elastic material comprising silicone, each tubelet of the plurality of tubelets being continuously walled and resilient having a first end that is open to the cavity, waiting until the melted plastic cools and strip the article with integrally formed hooks from the cavity and tubelets.

16. A method for making an article with integrally formed hooks for hook and loop fastening, the method comprising:

loading a first element of the article into a mold for the article, loading radio frequency sensitive plastic into the mold, delivering the radio frequency energy to the plastic in the mold so that the plastic heats in the mold from the radio frequency energy, applying a compressive surface to the plastic so that the plastic is forced against the first element and into a plurality of hook-shaped tubelets in the mold, integrally formed in an elastic material comprising silicone, each tubelet of the plurality of tubelets being continuously walled and resilient having a first end that is open for receiving the plastic, waiting until the melted plastic cools and strip the article with integrally formed hooks from the mold and tubelets.

17. The method of claim 16, further comprising:

delivering the radio frequency energy to the plastic in the mold so that the plastic heats in the mold, while applying the compressive surface to the plastic so that the plastic is forced against the first element and into the plurality of hook-shaped tubelets.

* * * * *